United States Patent [19]

Lebesgue

[11] Patent Number: 4,522,131
[45] Date of Patent: Jun. 11, 1985

[54] INSTALLATION FOR THE THERMAL TREATMENT OF PULVERULENT MINERAL PRODUCTS

[75] Inventor: Jean Lebesgue, Avon, France

[73] Assignee: Fives-Cail Babcock, Paris, France

[21] Appl. No.: 607,223

[22] Filed: May 4, 1984

[30] Foreign Application Priority Data

May 10, 1983 [FR] France .............................. 83 07754

[51] Int. Cl.$^3$ .............................................. F23J 3/00
[52] U.S. Cl. ................................... 110/229; 110/216; 432/14; 432/106
[58] Field of Search ............... 110/216, 229, 244, 347; 432/14, 67, 96, 105, 106

[56] References Cited

U.S. PATENT DOCUMENTS

| | | | |
|---|---|---|---|
| 4,004,876 | 1/1977 | Sylvest | 432/14 |
| 4,108,593 | 8/1978 | Christiansen | 432/14 |
| 4,288,103 | 9/1981 | Herchenbach et al. | 432/106 |
| 4,354,825 | 10/1982 | Fisher et al. | 432/14 |
| 4,402,667 | 9/1983 | Goldmann | 432/14 |
| 4,405,374 | 9/1983 | Krennbauer | 432/14 |
| 4,421,563 | 12/1983 | Cosar | 432/14 |
| 4,465,460 | 8/1984 | Cosar | 110/347 |

*Primary Examiner*—Edward G. Favors
*Assistant Examiner*—Steven E. Warner
*Attorney, Agent, or Firm*—Kurt Kelman

[57] ABSTRACT

An installation for the thermal treatment of a pulverulent mineral product by gases has a support frame at a first level, a furnace for the thermal treatment of the pulverulent mineral product in suspension in hot gases generated by the combustion of air and a fuel, two groups of series-connected cyclones connected to the furnace, one of the groups of cyclones being arranged upstream of the furnace and the other group of cyclones being arranged downstream of the furnace, and conduits connecting the cyclones to each other and to the furnace so that exhaust gases from the furnace pass successively through all the cyclones of the one group while a current of air passes through all the cyclones of the other group before entering the furnace to serve as the combustion air, the exhaust gases heating the product before it enters the furnace and the air current cooling the treated product. The furnace and two of the cyclones located, respectively, immediately upstream and immediately downstream of the furnace are mounted on the support frame at the first level. A superstructure is affixed to the support frame and supports the remaining cyclones at a second level higher than the first level.

3 Claims, 4 Drawing Figures

INSTALLATION FOR THE THERMAL TREATMENT OF PULVERULENT MINERAL PRODUCTS

The present invention relates to improvements in an installation for the thermal treatment of a pulverulent mineral product by gases. The mineral material to be treated is comminuted into powder form, preheated and then subjected to the thermal treatment proper whereafter it is cooled, the treatment being effected by heat exchange between currents of gas and the product suspended therein.

The installation comprises a furnace for the thermal treatment of the pulverulent mineral product in suspension in hot gases generated by the combustion of air and a fuel, two groups of series-connected cyclones connected to the furnace, one of the groups of cyclones being arranged upstream of the furnace and the other group of cyclones being arranged downstream of the furnace, and conduit means connecting the cyclones to each other and to the furnace so that exhaust gases from the furnace pass successively through all the cyclones of the one group while a current of air passes through all the cyclones of the other group before entering the furnace to serve as the combustion air, the exhaust gases heating the product before it enters the furnace and the air current cooling the treated product.

Throughout the specification and claims, the term "cyclone" covers any suitable separator for separating solids from gaseous fluids, cyclones with vertical axes being specifically described and illustrated herein.

The heat exchanges between the product to be treated and the exhaust gases from the furnace, on the one hand, and between the thermally treated product and the air, on the other hand, take place partly in the cyclones and partly in the connecting conduit means where the product is held in suspension by the exhaust gases and air, respectively, which flow through the conduit means and entrain the product. In the cyclones, the product is separated from the gaseous fluid current to be suspended in an upstream portion of the gas circuit so that all of the heat exchanges take place in counter-current fashion.

In conventional installations of this type, the one group of cyclones constituting a preheating means for the product to be treated in the furnace, the furnace and the other group of cyclones constituting a cooling means for the treated product are superposed to permit the product to be transferred by gravity between the successive stages of the preheating means, the furnace and the cooling means. This disposition produces an installation of considerable height, requiring a massive tower-like support frame which is expensive, particularly if risks of earthquakes or of strong winds have to be taken into consideration.

It has been proposed to overcome this disadvantage by placing all the cyclones and, possibly, the furnace at the same level, the cyclones and the furnace being connected by U-shaped conduits whose bent portion is situated below the level of the outlet point of the cyclones. Such an installation is very congested at the bottom and has long sections of conduits in which no thermal exchange takes place because the latter is produced in the conduits only in the ascending portions of the U-shaped conduits.

It is the primary object of this invention to provide an installation of the first-indicated type which, while relatively low, is no more congested at the bottom than conventional installations with superposed cyclones.

The above and other objects are accomplished according to the invention with a superstructure affixed to the support frame and having support means at a second level higher than the first level. The furnace and two of the cyclones located, respectively, immediately upstream and immediately downstream of the furnace are mounted on the support means of the support frame at the first level, and at least some of the remaining cyclones are mounted on the support means of the superstructure at the higher level.

It is understood that the first level should be as low as practically possible and as far as compatible with the requirement of the evacuation of the product from the discharge points of the cyclones and of the input of the gaseous fluids and/or the product to be treated in the furnace or their evacuation therefrom when the same are effected through the bottom of the furnace.

Since the furnace and the two cyclones immediately upstream and downstream thereof are of brick or equipped with a refractory lining, they are quite heavy. Therefore, by placing them at a lower level than in known installations, the cost of the support means therefor is considerably reduced. The remaining cyclones, through which the air or the exhaust gases from the furnace pass at a lower temperature, require no refractory lining and are, therefore, much lighter. They may be supported on a higher level on a relatively light superstructure affixed to the support frame. Equivalently, the remaining cyclones may be mounted on the support frame itself if the arrangement of the furnace and the two cyclones immediately adjacent thereto permit such a disposition. It is understood that this functionally equivalent arrangement is covered by the claimed superstructure.

According to a preferred feature of the present invention, the last one of the series of cyclones serving to cool the product is disposed at a level which is high enough to permit the cooled product to be fed directly by gravity to a complementary cooler, a discharge conveyor, a loading station or the like.

The above and other objects, advantages and features of this invention will be explained in more detail in the following description of a now preferred embodiment thereof, taken in conjunction with the accompanying drawing wherein FIG. 1 is a circuit diagram schematically showing a calcining installation according to the invention;

Figure 1:
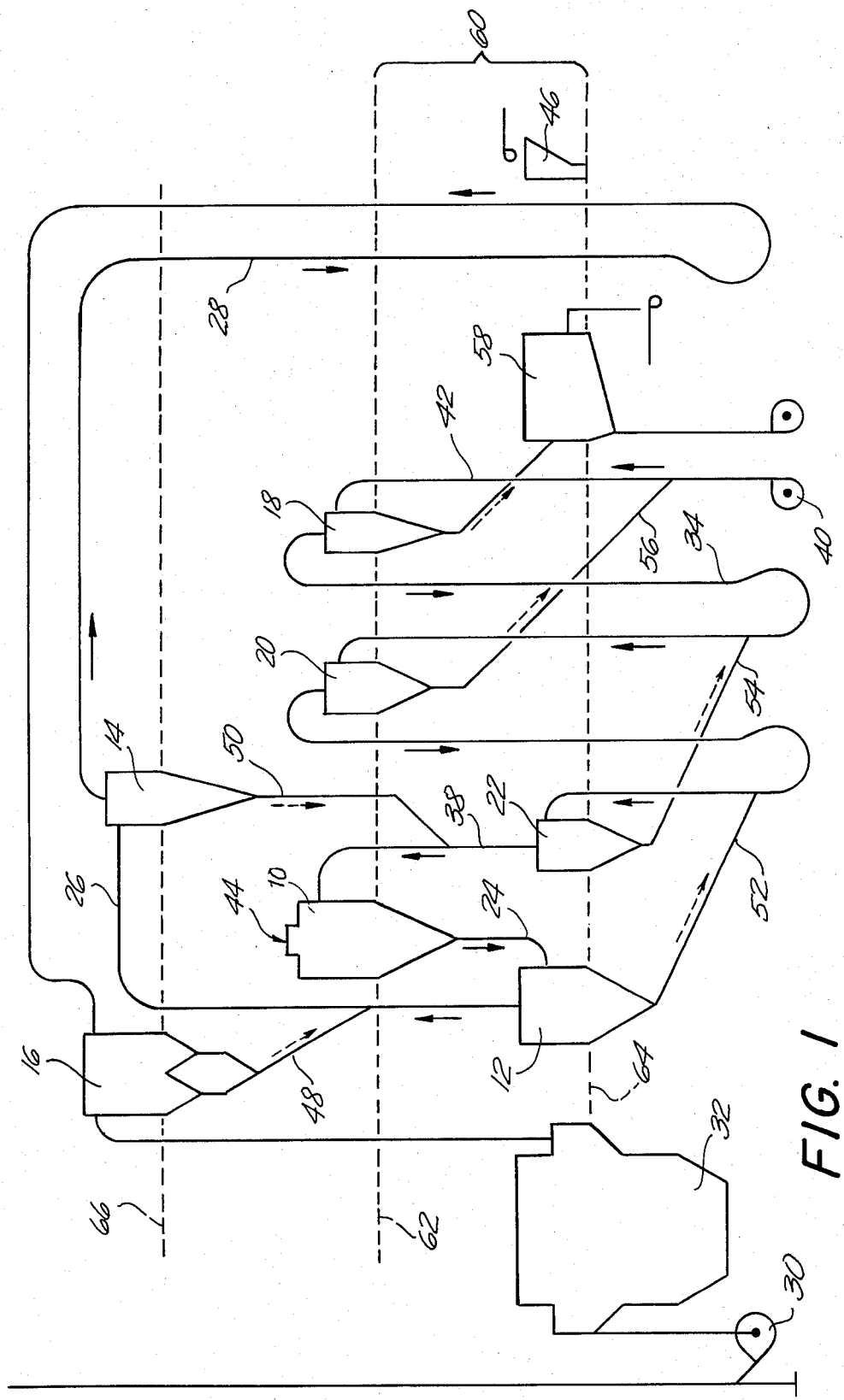

Referring now to the drawing and first to FIG. 1, there is shown an installation for the thermal treatment of a pulverulent mineral product by gases, more particularly a calcining installation. As merely schematically indicated in this figure by broken lines, the installation comprises support frame 60 having support means at a first level and comprising, in the illustrated embodiment, first platform means 62 and second platform means 64. The first platform means is positioned higher than the second platform means. Calcining furnace 10 for the thermal treatment of the pulverulent mineral product in suspension in hot gases generated by the combustion of air and a fuel is mounted on support means 62 of support frame 60 at the first level. Two groups of series-connected cyclones 12, 14, 16 and 18, 20, 22 are connected to furnace 10. One of the groups of cyclones is arranged upstream of the furnace and the other group of cyclones is arranged downstream of the furnace. Conduit means connects the cyclones to each other and to the furnace. As shown, this conduit means comprises conduit 24 connecting cyclone 12 to furnace 10, conduit 26 connecting cyclone 12 to cyclone 14 and conduit 28 connecting cyclone 14 to cyclone 16 for successively passing the exhaust gases from the furnace through the cyclones of the one group, and conduit 34 connecting cyclone 18 to cyclone 20, conduit 36 connecting cyclone 20 to cyclone 22 and conduit 38 connecting cyclone 22 to furnace 10 for successively passing a current of air through the cyclones of the other group before entering the furnace to serve as the combustion air. The exhaust gases preheat the product before it enters the furnace and the air current cools the treated product.

At the outlet of last cyclone 16 of the one group, the exhaust gases are removed by ventilator 30 connected to the outlet, after they pass through filter 32 which removes residual powder particles from the gases. The filtered gases are vented to the atmosphere by the ventilator.

Air is supplied to first cyclone 18 of the other group by ventilator 40 through conduit 42 connecting the output of the ventilator to cyclone 18. In furnace 10, the air flowing in through conduit 38 is used as combustion air for the fuel injected into the furnace through tuyere 44.

The pulverulent product to be treated is introduced into conduit 28 by feeding device 46 and is held in suspension in the conduit by the exhaust gases from furnace 10 flowing through this conduit and the current of gases (indicated by arrows along the conduits) entrains the suspended product to cyclone 16. In the cyclone, the pulverulent product is separated from the gases and collected in the lower part of the cyclone whence it is removed by gravity by means of pipe 48 connected to the outlet of cyclone 16 and leading into conduit 26 (see arrow in broken lines). As the pulverulent product enters conduit 26 counter-currently to the flow of the exhaust gases through this conduit, it is suspended in the gas current and entrained to cyclone 14. There, again, the solid product is separated from the gases and drops through the outlet of the cyclone into pipe 50 which feeds the product in the direction of the arrow indicated in broken lines into conduit 38. The air circulating in conduit 38 entrains the product, which has been preheated by the exhaust gases in conduits 26 and 28 as well as cyclones 14 and 16, to furnace 10. In the furnace, the product is maintained in suspension by the air current and is thermally treated, i.e. calcined, by the heat furnished by the combustion of the air and the fuel injected through tuyere 44.

Upstream, the combustion gases are exhausted from the furnace at the lower portion thereof and the exhaust gases entrain the thermally treated, i.e. calcined, product through conduit 24 into cyclone 12. Again, the solid product is separated from the gases in the cyclone and flows in the direction of the broken arrow through pipe 52 into conduit 36 where the air current carries the thermally treated product successively through cyclone 22, pipe 54, conduit 34, cyclone 20, pipe 56, conduit 42 and cyclone 18 to be cooled by heat exchange with progressively cooler air. The outlet of cyclone 18 is connected to supplemental cooler 58 where the calcined product is subjected to additional cooling. The cooled product may then be directed from cooler 58 to any desired location, such as conveyors, storage bins, loading stations and the like.

According to the invention, furnace 10 and cyclones 12 and 22, which have refractory linings because very hot gases pass therethrough and which, therefore, are quite heavy, are disposed at as low a level as feasible to reduce the massiveness of the support means required therefor. Cyclones 12 and 22 should be positioned high enough to permit the thermally treated pulverulent product to flow by gravity through pipes 52 and 54. Furnace 10 should be positioned above cyclone 12 to reduce the length of conduit 24 leading from the lower end of the furnace to the cyclone. For this purpose, the support means of support frame 60 comprises first platform means 62 and second platform means 64, first platform means 62 being positioned higher than second platform means 64. Furnace 10, as well as cyclones 18 and 20 of the downstream group of cyclones, are mounted on the first platform means while the two cyclones 12 and 22 immediately upstream and downstream from the furnace are mounted on the second platform means.

Superstructure 66 is affixed to support frame 60 and has support means at a second level higher than the first level and remaining cyclones 14 and 16 are mounted on the support means of the superstructure at the higher level.

Figure 2:
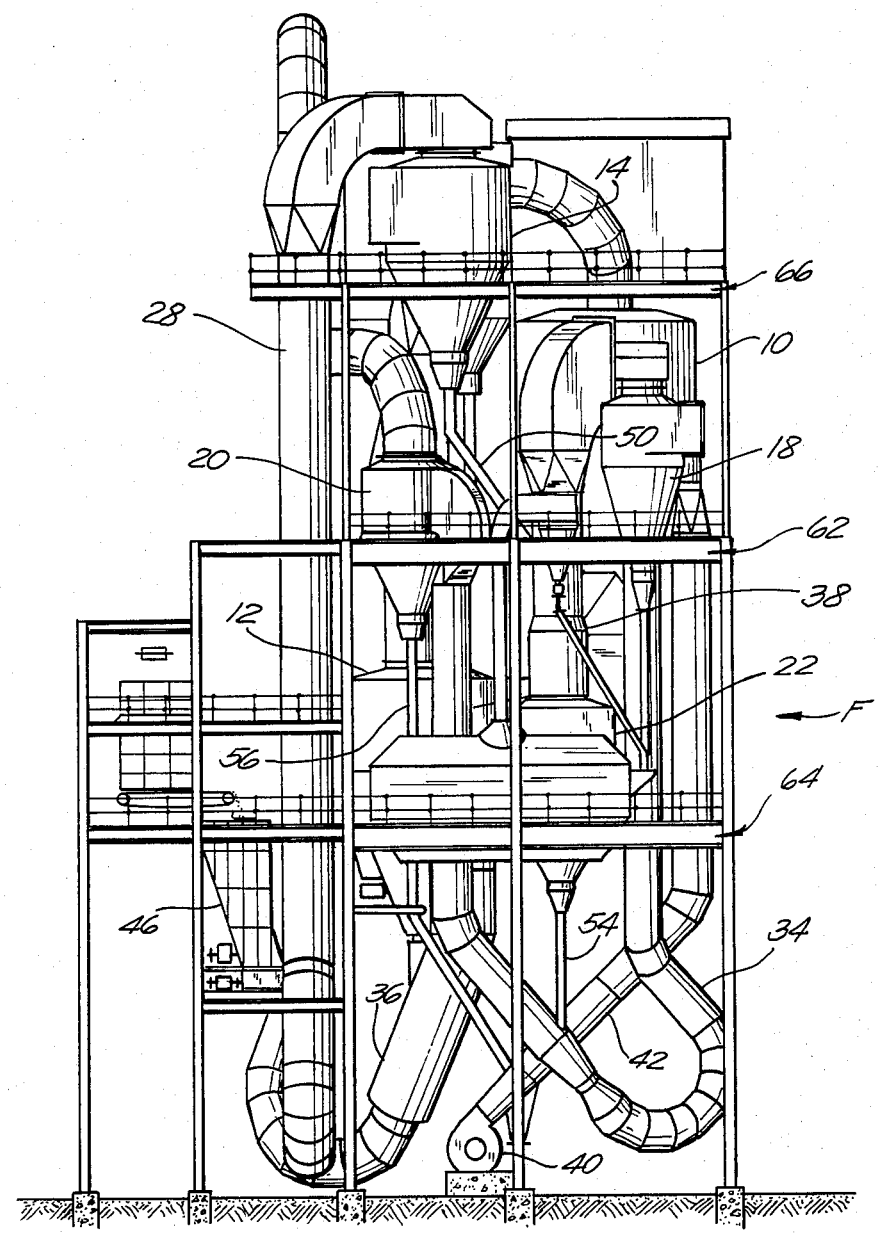
FIG. 2 is a side elevational view of the installation.
Figure 3:
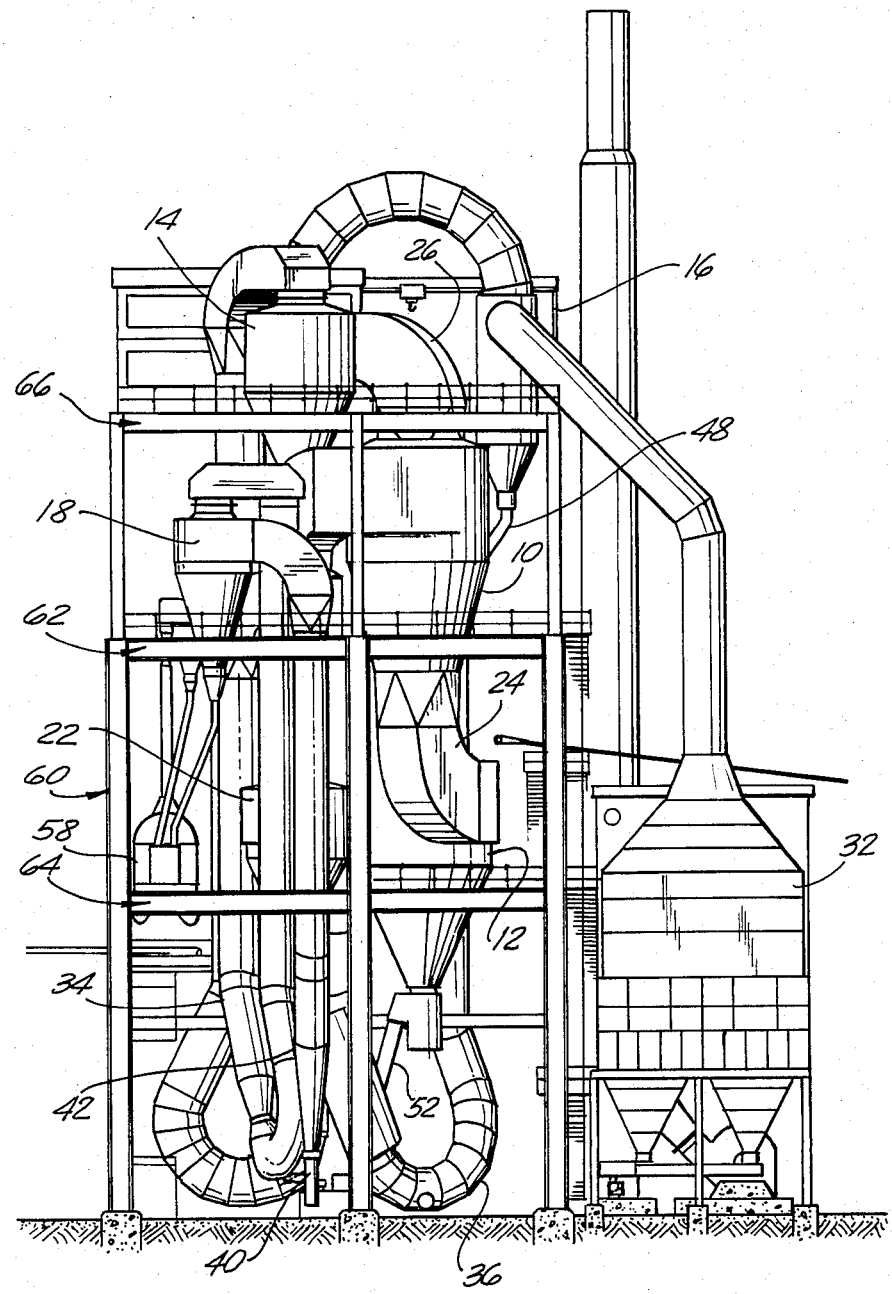
FIG. 3 is another side elevation taken in the direction of arrow F in FIG. 2.
Figure 4:
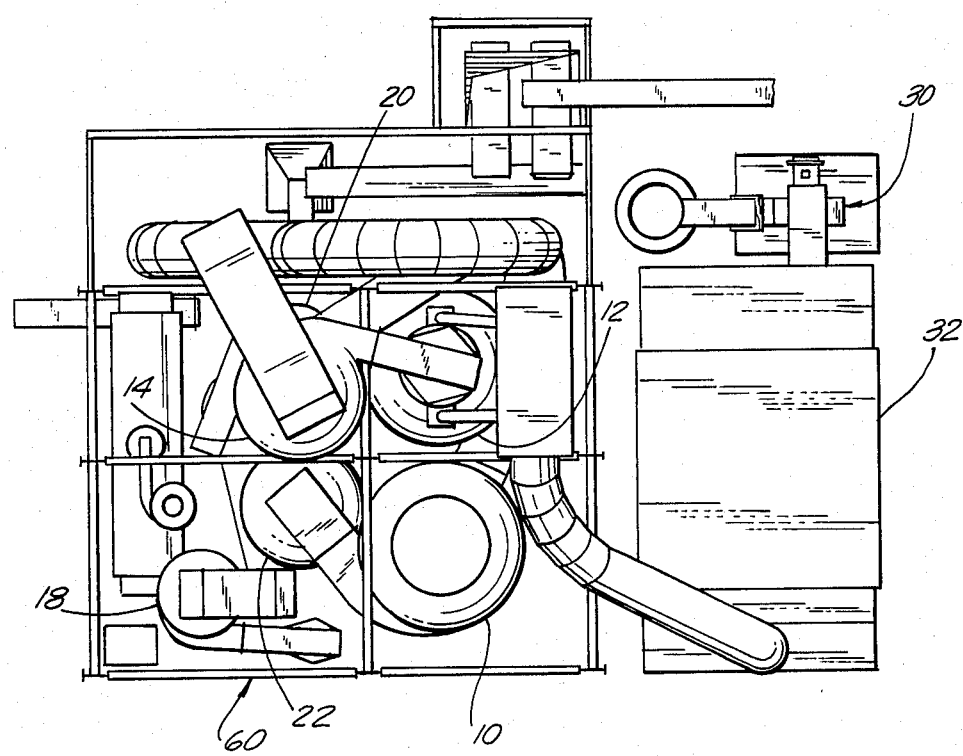
FIG. 4 is a top view of the installation.

The structural details of the installation are shown in FIGS. 2 to 4. Relatively low support frame 60 is shown to comprise upper platform 62 and lower platform 64 supporting furnace 10 and cyclones 12 and 22, the cyclones being mounted on the lower platform and the furnace on the higher platform. Cyclones 18 and 20 of the downstream group of cyclones also are mounted on upper platform 64. Remaining cyclones 14 and 16 of the upstream group of cyclones are mounted on superstructure 66 which is affixed to support frame 60. This superstructure is much lighter than the support frame because only cooled gases flow through cyclones 14 and 16 so that the latter require no refractory linings and are, accordingly, relatively light.

This disposition of the furnace and cyclones results in a very compact and relatively low assembly which leaves ample free space at the ground level, as can be seen in FIGS. 2 and 3. Compared to the conventional installation with superposed furnace and cyclones, the weight of the support frame is reduced by about 40%.

The described and illustrated disposition of the cyclones requires conduits 34 and 36 to be U-shaped, as can be seen in FIG. 1. The portion of these conduits not utilized for heat exchange between the gases flowing therethrough and the pulverulent product suspended therein may be reduced by placing cyclones 18 and 20 at a lower level.

To enable product feeding device 46 to be placed at a low level, conduit 28 connecting cyclones 14 and 16 also is of U-shape. This disposition has the advantage of permitting better extraction of the heat from the exhaust gases flowing through the conduit. It is, however, only optional and, if desired, the product feeding device may be placed on the upper platform of the support frame or even on the superstructure.

While the present invention has been described in connection with a now preferred embodiment thereof, it will be understood by those skilled in the art that various modifications, particularly in connection with the furnace structure, may be made in the described and illustrated installation without departing from the scope of this invention, as defined in the appended claims. For example, if the product input is at a lower end of the furnace and the output is at its upper end, the positions of the furnace and the cyclone at its output end may be reversed, the furnace being arranged lower than, or at the same level as, the cyclone.

What is claimed is:

1. An installation for the thermal treatment of a pulverulent mineral product by gases, comprising
   (a) a support frame having support means at a first level,
   (b) a furnace for the thermal treatment of the pulverulent mineral product in suspension in hot gases generated by the combustion of air and a fuel,
   (c) two groups of series-connected cyclones connected to the furnace, one of the groups of cyclones being arranged upstream of the furnace and the other group of cyclones being arranged downstream of the furnace, and
   (d) conduit means connecting the cyclones to each other and to the furnace so that exhaust gases from the furnace pass successively through all the cyclones of the one group while a current of air passes through all the cyclones of the other group before entering the furnace to serve as the combustion air, the exhaust gases heating the product before it enters the furnace and the air current cooling the treated product, wherein the improvement comprises
   (e) a superstructure affixed to the support frame and having support means at a second level higher than the first level,
   (f) the furnace and two of the cyclones located, respectively, immediately upstream and immediately downstream of the furnace being mounted on the support means of the support frame at the first level, and
   (g) at least some of the remaining cyclones being mounted on the support means of the superstructure at the higher level.

2. An installation for the thermal treatment of a pulverulent mineral product by gases, comprising
   (a) a support frame having support means at a first level, the support means of the support frame comprising a first platform means and a second platform means, the first platform means being positioned higher than the second platform means,
   (b) a furnace for the thermal treatment of the pulverulent mineral product in suspension in hot gases generated by the combustion of air and a fuel,
   (c) two groups of series-connected cyclones connected to the furnace, one of the groups of cyclones being arranged upstream of the furnace and the other group of cyclones being arranged downstream of the furnace, and
   (d) conduit means connecting the cyclones to each other and to the furnace so that exhaust gases from the furnace pass successively through all the cyclones of the one group while a current of air passes through all the cyclones of the other group before entering the furnace to serve as the combustion air, the exhaust gases heating the product before it enters the furnace and the air current cooling the treated product, wherein the improvement comprises
   (e) a superstructure affixed to the support frame and having support means at a second level higher than the first level,
   (f) the furnace and two of the cyclones located, respectively, immediately upstream and immediately downstream of the furnace being mounted on the support means of the support frame at the first level, the furnace being mounted on the first platform means and at least one of the two cyclones being mounted on the second platform means, and
   (g) at least some of the remaining cyclones being mounted on the support means of the superstructure at the higher level.

3. The installation of claim 2, wherein the remaining cyclones of the one group of cyclones are mounted on the first platform means while the remaining cyclones of the other group of cyclones are mounted on the support means of the superstructure.

* * * * *